3,699,124
Patented Oct. 17, 1972

3,699,124
2-BENZOYL INDOLE DERIVATIVES

Andre Gagneux, Basel, Switzerland, and Arne Elof Brandstrom, Goteborg, and Stig Ake Ingomar Carlsson, Molnlycke, Sweden, assignors to Ciba-Geigy Corporation, Ardsley, N.Y.
No Drawing. Filed July 22, 1969, Ser. No. 34,202
Claims priority, application Switzerland, July 23, 1968, 11,047/68
Int. Cl. C07d 27/56
U.S. Cl. 260—326.15                 6 Claims

ABSTRACT OF THE DISCLOSURE 2-benzoyl-2-(2-tertiaryamino - ethoxy)-indole derivatives and their pharmaceutically acceptable acid addition salts, which compounds have analgesic as well as tranquilising, antianaphylactoid and antioedematous activities in mammals; pharmaceutical compositions comprising said compounds, together with a pharmaceutically acceptable diluent or carrier therefor and methods for producing analgesic, tranquilising, antianaphylactic and antioedematous effects in mammals are also provided; an illustrative embodiment is 1-ethyl-2-(p-ethoxybenzoyl)-3 - (2-diethylamino-ethoxy) - 5,6-methylenedioxy-indole.

---

The invention relates to 2-benzoyl-3-(2-tertiaryaminoethoxy)-indole derivatives and their pharmaceutically acceptable acid addition salts, processes for the production thereof, pharmaceutcial compositions containing these compounds and the use thereof.

More particularly, the present invention pertains to compounds of the formula

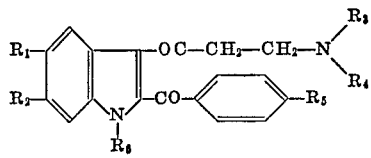

(I)

wherein one of $R_1$ and $R_2$ is hydrogen, chloro, methyl or methoxy and the other one is hydrogen, or $R_1$ and $R_2$ together are methylenedioxy;
$R_3$ and $R_4$ are alkyl having at most 4 carbon atoms, or $R_3$ and $R_4$ together with the adjacent nitrogen are 1-pyrrolidinyl or piperidino;
$R_5$ is hydrogen, chloro, methyl or alkoxy having at most 3 carbon atoms; and
$R_6$ is alkyl having at most 3 carbon atoms, allyl of 2-propinyl;

and the pharmaceutically acceptable acid addition salts thereof.

A preferred subclass are compounds of the Formula I as illustrated above wherein each of $R_1$ and $R_2$ is hydrogen, or $R_1$ and $R_2$ together are the methylenedioxy; each of $R_3$ and $R_4$ is ethyl or $R_3$ and $R_4$ together with the adjacent nitrogen is 1-pyrrolidinyl; $R_5$ is hydrogen or ethoxy; and $R_6$ is methyl or ethyl, as well as the pharmaceutically acceptable acid addition salts thereof.

Preferred specific compounds according to Formula I are:

1-methyl-2-benzoyl-3-[2-(1-pyrrolidinyl)-ethoxy]-indole,
1-ethyl-2-(p-ethoxybenzoyl)-3-(2-diethylaminoethoxy)-5,6-methylenedioxy-indole,
1-methyl-2-(p-ethoxybenzoyl)-3-(2-diethylamino-ethoxy)-5,6-methylenedioxy-indole, and
1-methyl-2-(p-ethoxybenzoyl)-3-[2-(1-pyrrolidinyl)-ethoxy]-5,6-methylenedioxy-indole, as well as the pharmaceutically acceptable acid addition salts thereof.

The invention pertains also to pharmaceutical compositions comprising a compound of the Formula I and/or a pharmaceutically acceptable acid addition salt thereof together with a pharmaceutically acceptable diluent or carrier therefor.

Furthermore, the invention pertains to a method of relieving pain in mammals as well as methods for producing tranquilising, antianaphylactoid and antioedematous effects in mammals which comprises administering to said mammals an effective amount of a compound of the Formula I and/or a pharmaceutically acceptable acid addition salt thereof.

In the compounds of Formula I and in the corresponding starting materials referred to below, $R_3$ and $R_4$ are, as alkyl, e.g. methyl, ethyl, n-propyl, n-butyl or isobutyl. As alkoxy, $R_5$ is e.g. methoxy, ethoxy, n-propoxy or isopropoxy group and $R_6$ is methyl, ethyl, n-propyl, isopropyl, allyl or 2-propionyl.

The compounds of Formula I and their pharmaceutically acceptable acid addition salts are produced by reacting a metal salt of an indole derivative of the Formula II

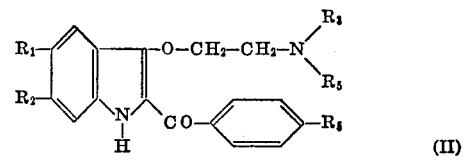

(II)

wherein $R_1$, $R_2$, $R_3$, $R_4$ or —$NR_3R_4$ and $R_5$ have the meaning given for Formula I, or an indole derivative of the Formula II in the presence of an alkaline condensation agent, with a reactive ester of a hydroxy compound of the Formula III,

$$R_6\text{—OH} \qquad (III)$$

wherein $R_6$ has the meaning given for Formula I and, when required, converting a compound of the Formula I thus obtained into a pharmaceutically acceptable acid addition salt. The reaction is preferably performed in an inert organic solvent at temperatures between ca. 0° and ca. 60°. Suitable as a solvent are, e.g. hexamethyl phosphoric acid triamide, dimethylsulfoxide, dimethylformamide or benzene. Suitable as alkaline condensation agents are, e.g. sodium amide, lithium amide, sodium hydride or lithium hydride, with which preferably the indole derivative of the Formula II is converted in situ into the corresponding alkali metal salt. As reactive esters of hydroxy compounds of the Formula III, their hydrohalic acid esters, e.g. iodides, bromides or, if liquid, chlorides, are, for example used; also their arensulfonic acid esters e.g. p-toluenesulfonic acid esters; lower alkanesulfonic acid esters e.g. methanesulfonic acid esters; dimethylsulfate and diethylsulfate. Examples of halides are: methyl iodide, ethyl iodide, ethyl bromide, propyl bromide, isopropyl bromide, allyl iodide, allyl bromide, allyl chloride and 2-propinyl bromide.

The indole derivatives of the Formula II are themselves novel. Their production is hereinafter described.

Compounds of the Formula I and their pharmaceutically acceptable acid addition salts are produced, according to a second process, by reacting an indole derivative of the Formula IV,

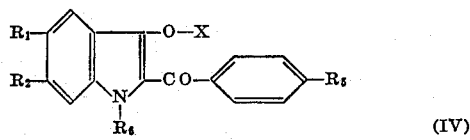

with a compound of the general Formula V

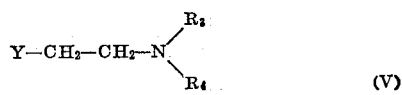

whereby in the Formulae IV and V

X and Y are atoms or atom groups, which can react with each other to form an ether bridge between the 3-position of indole and the ethylene group, and $R_1$, $R_2$, $R_5$ and $R_6$, as well as $R_3$, $R_4$ or $-NR_3R_4$ have the meanings given for Formula I and, when required, converting a compound of the Formula I thus obtained into a pharmaceutically acceptable acid addition salt thereof.

In the Formulae IV and V,

X is, e.g. hydrogen, sodium, potassium, rubidium or trialkylammonium, and

Y is, e.g. halo such as, e.g. chloro or bromo, or a functional equivalent group such as, e.g., arensulfonyloxy, such as benzenesulfonyloxy or toluenesulfonyloxy.

The reaction, according to the invention, is preferably carried out in a solvent, e.g. in acetone, dioxane, ethyl acetate, dimethylsulfoxide or dimethylformamide, or in a mixture of solvents. Optionally, a condensation agent such as, e.g. potassium carbonate, rubidium carbonate or sodium hydride is used.

The production of the starting materials of the Formula IV is described below.

According to a third process, compounds of the Formula I and their pharmaceutically acceptable acid addition salts are produced by reacting, in the presence of a strong base, an indole derivative of the Formula VI

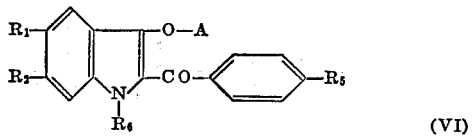

wherein

A is alkyl having at most 3 carbon atoms, and $R_1$, $R_2$, $R_5$ and $R_6$ have the meanings given for Formula I, with a compound of the Formula VII

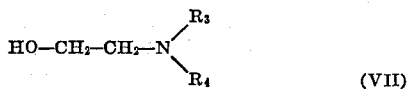

wherein $R_3$ and $R_4$ have the meaning given for Formula I and, when required, converting a compound of the Formula I thus obtained into a pharmaceutically acceptable acid addition salt thereof. The reaction is preferably performed at temperatures, at which the liberated methanol distills off, optionally with a portion of the reaction medium. As reaction medium can be used, for example, an excess of a compound of the Formula VII alone or in admixture with an inert organic solvent such as, e.g. toluene. Alkali metals or alkali metal compounds are, for example, used as strong bases, such as sodium or sodium hydride, by means of which, optionally, the equimolecular amount of the compound of the Formula VII, or a fraction thereof, is converted, before the reaction with the indole derivative of the Formula VI, into the corresponding alcoholate.

Details concerning the production of the starting materials of the Formula VI are given below.

The indole derivatives, required as starting materials for the three aforementioned production processes, can be produced as follows: the indole derivatives of the Formula II are produced, for example, starting with anthranilic acid methyl esters, optionally substituted in accordance with the definitions for $R_1$ and $R_2$. These are condensed with phenacyl halides of the Formula X, illustrated below, which are optionally p-substituted according to the definition for $R_5$, to give N-phenacyl anthranilic acid methyl esters. Boiling of these esters with sodium ethylate in ethanol brings about cyclisation to the 2-benzoyl-3-hydroxyindole, optionally substituted according to the definitions for $R_1$, $R_2$ and $R_5$, of the Formula VIII

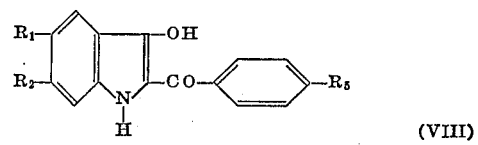

The compounds of the Formula VIII are converted into basic ethers of the Formula II in a manner analogous to the second stated process for the production of compounds of the Formula I, e.g. by the boiling of their monopotassium compounds with a tertiary-aminoethyl halide, embraced by the Formula V, in ethyl acetate.

The starting materials of the Formula IV are produced by firstly condensing an N-substituted anthranilic acid ester of the Formula IX

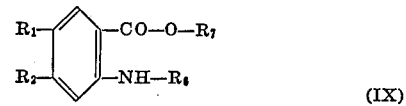

wherein $R_7$ is lower alkyl, especially methyl, and $R_1$, $R_2$ and $R_6$ having the meanings given for Formula I, whereby $R_6$ is preferably methyl, with a phenacyl halide of the Formula X

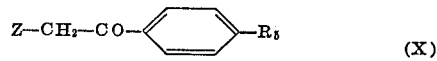

wherein

Z is bromo or chloro, and $R_5$ has the meaning given for Formula I, to produce an N-substituted N-phenylacyl anthranilic acid alkyl ester of the Formula XI

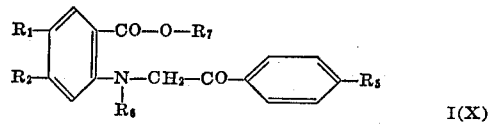

wherein $R_1$, $R_2$, $R_5$, $R_6$ and $R_7$ have the meanings given for Formula I or Formula IX. The condensation is performed, for example, by heating in the presence of an excess of the anthranilic acid ester of the Formula IX, which acts as an acid-binding agent.

The compounds of the Formula XI are reacted with an alkaline condensation agent in an organic solvent, whereby cyclisation occurs to produce desired indole derivative of the Formula IVa,

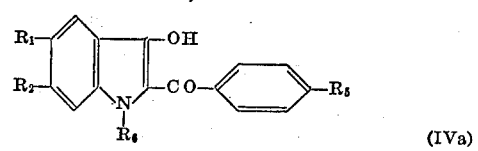

wherein $R_1$, $R_2$, $R_5$ and $R_6$ have the meanings given for Formula I. For example, a compound of the Formula XI is boiled with a lower alkali alcoholate, e.g. with sodium methylate, in a lower alkanol, e.g. methanol, and the hydroxy compound is liberated from the directly formed alkali metal salt by acidification.

In order to obtain indole derivatives of the Formula VI, starting materials for the third mentioned process, 2- benzoyl-3-hydroxy-indoles of the Formula VIII, are firstly converted into their methyl ethers, e.g. by reacting the monosodium salts with dimethylsulfate or methyl iodide in an organic solvent, such as hexamethyl phosphoric acid triamide. A lower alkyl, alkenyl or alkinyl group is then introduced into the obtained methyl ethers as $R_6$. This can be performed analogously to the first stated process for production of compounds of the Formula I, e.g. by conversion of the methyl ether with sodium hydride in an inert organic solvent, such as hexamethyl phosphoric acid triamide, into its sodium salt and reaction of the latter with a reactive ester of a hydroxy compound of the Formula III, e.g. with an iodide or bromide.

It is also possible to convert a 1-substituted 2-benzoyl-3-hydroxy indole of the Formula IVa, in the above stated manner, into its methyl ether corresponding to the Formula VI.

The compounds of Formula I and their pharmaceutically acceptable acid addition salts may be prepared according to a fourth process by reacting a compound of the Formula XII

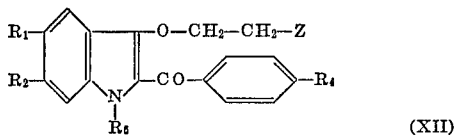

(XII)

wherein Z is halogen, lower alkanesulfonyloxy or arenesulfonyloxy e.g. the methanesulfonyloxy or p-tolylsulfonyloxy and $R_1$, $R_2$, $R_5$ and $R_6$ have the meanings given for Formula I with an amine of the Formula XIII

(XIII)

wherein $R_3$ and $R_4$ or $-NR_3R_4$ have the meanings given for Formula I and, when required, converting a compound having the Formula I thus obtained into a pharmaceutically acceptable acid addition salt thereof.

Starting materials for the above process are prepared for example by reacting e.g. the sodium salt of a 2-benzoyl-3-hydroxy-indole of the Formula IVa, as illustrated above, with 1-chloro-2-bromo-ethane.

The new indole derivatives of the general Formula I are optionally converted into their pharmaceutically acceptable acid addition salts, with e.g. hydrochloric acid, hydrobromic acid, sulfuric acid, phosphoric acid, methanesulfonic acid, ethanesulfonic acid, 2-hydroxyethanesulfonic acid, acetic acid, lactic acid, succinic acid, fumaric acid, maleic acid, malic acid, tartaric acid, citric acid, ascorbic acid, benzoic acid, salicyclic acid, phenylacetic acid, mandelic acid or embonic acid. The production of the stated and other salts can be carried out in the usual manner. For example, the acid desired as the salt component, or a solution of the acid, is added to an optionally heated solution of an amine of the Formula I in an organic solvent such as diethyl ether, methanol, ethanol, isopropanol, acetone or butanone, or in water, and the salt which precipitates directly or after cooling, concentration or the addition of a second organic liquid, e.g. diethyl ether, to one of the stated alkanols is separated.

The compounds of the Formula I and their pharmaceutically acceptable acid addition salts have been found to possess valuable pharmacological properties. In particular they exhibit anaylgesic activity as well as tranquislising, antianaphylacetoid and antioedematous action coupled with a low order of toxicity. They are therefore suitable as active substances in pharmaceutical preparations for the relief and removal of conditions of pain, for the treatment of allergies and of certain mental disturbances, which react positively to treatment with tranquilisers.

The analgesic action of the compounds of Formula I, e.g. of 1-methyl-2-benzoyl-3-[2-(1-pyrrolidinyl)-ethoxyl]-indole,
1-ethyl-2-(p-ethoxy-benzoyl)-3-(2-diethylamino-ethoxy)-5,6-methylenedioxy-indole,
1-methyl-2-(p-ethoxy-benzoyl)-3-(2-diethylamino-ethoxy)-5,6-methylenedioxy-indole,
1-methyl-2-(p-ethoxy-benzoyl)-3-[2-(1-pyrrolidinyl)-ethoxy]-5,6-methylenedioxy indole and of the hydrochloride hydrates thereof is demonstrated, e.g. for the mouse by measurement of the extension of the reaction time, resulting from the oral administration of these compounds, to irritation of the tail produced by thermal radiation according to the experimental arrangement of H. Friebel and Cl. Reichle, Arch. Exp. Path. and Pharmakol. 226, 551 (1955) (tail-flick test). In this test, significant extrusion of the said reaction time was observed on the peroral administration of from 10 to 50 mg./kg. of the above-mentioned hydrochloride hydrates.

The analgesic activity is also demonstrated according to the method described by E. Siegmund, R. Cadmus and G. Lu, Proc. Soc. Exp. Biol. Med. 95, 729 (1957), whereby the amount of substance is determined which is required to prevent the syndrom produced by the intraperitoneal injection of 2-phenyl-1,4-benzoquinone. In this test, the results obtained are comparable with those for the above-mentioned "tail-flick" test.

The antianaphylactoid effectiveness of the above stated, and other indole derivatives of the Formula I is determined, for example, by the dextran hyperergy of the rat. To groups each consisting of 20 rats are administered specific dosages per os of the substances to be tested. After 60 minutes, an intraperitoneal injection is made to each of the test animals, and likewise to those of an equally large or larger group of control animals, of 1 ml. of a 6% aqueous dextran solution, as a result of which swellings of the acral parts of the body are produced. 120 minutes after the dextran injection, the animals are sacrificed all paws are amputated and the difference in weight determined by comparing the results with those obtained from the paws of completely untreated animals. By this comparison of the weight differences between the paws of the test animal groups and of the control animal groups, the reduction in swelling in percent is determined which has been effected by administration of the various test substances. One intraperitoneal injection of from 5 to 200 mg./kg. of 1-methyl-2-benzoyl-3-[2-(1-pyrrolidinyl)-ethoxy]-indole hydrochloride hydrate a marked reduction of the induced swelling is observed.

Similar marked results are obtainable using the other three specific hydrochloride hydrates referred to hereinabove.

The central depressant, especially tranquilising activity of the compounds of Formula I is shown e.g. from the results of selected standard tests [cp. R. Domenjoz and W. Theobald, Arch. int. Pharmacodyn. 120, 450 (1959); W. Theobald et al., Arch. int. Pharmacodyn. 148, 560 (1964); W. Theobald et al., Arzneimittelforsch. 17, 561 (1967)].

Thus it is illustratively demonstrated that 1-methyl-2-benzoyl-3-[2-(1-pyrrolidinyl)-ethoxy]-indole hydrochloride hydrate, on oral administration in amounts of about 5 to 50 mg./kg. subcutaneously to mice, anesthetised intraperitoneally with 40 mg./kg. of the short-acting anesthetic N,N-diethyl-2-methoxy-4-allyl-phenoxyacetic acid amide, potentiates, i.e. prolongs, the effect of the anesthetic to a very significant extent.

In addition to the foregoing it has been found that compounds of the Formula I exhibit marked antioedematous activity using standard test methods, e.g. on intraperitoneal injection in tests involving the induction of oedema with serotonin.

For their intended various uses, the compounds of the invention are administered, preferably orally or rectally, in amounts depending on the species, age, weight and the special conditions of the individuum to be treated. In general, the daily dosages for mammals vary between 0.1 and 10 mg./kg. Suitable dosage units such as dragées, tablets, capsules or suppositories preferably contain as active substance 10–250 mg. of a compound of the Formula I, or of a pharmaceutically acceptable acid addition salt thereof, this amount consitituting preferably 20–80% of the dosage unit.

Dosage units for oral administration, which contain as active substance a compound of the Formula I or a pharmaceutically acceptable acid addition salt thereof, are produced by mixing the active substance with, e.g. solid, pulverulent carrier substances such as lactose, saccharose, sorbitol and mannitol, or starch such as e.g. potato starch, maize starch and amylopectin. Also suitable are laminaria powder or citrus pulp powder. Cellulose derivatives or gelatine and also lubricants such as, e.g. magnesium or calcium stearate, or polyethylene glycols having a waxlike consistency (Carbowax) can be added for the production of tablets or dragée cores. The latter can be coated, e.g. with concentrated sugar solutions, containing gum arabic, talcum and/or titanium dioxide. They can also be coated with a lacquer dissolved in easily volatile organic solvents or mixtures of solvents. Dyestuffs can be added to these coatings, e.g. to distinguish between varying contents of active substance. Soft gelatine capsules (bead-shaped, closed capsules) and other closed capsules consist e.g. of a mixture of gelatine and glycerin and contain for example, mixtures of the active substance with carbowax, and hard gelatine capsules contain, e.g. granulates of the active substance with solid pulverulent carriers such as, e.g. lactose, saccharose, sorbitol or mannitol; starches such as potato starch, maize starch or amylopectin; cellulose derivatives or gelatin and also magnesium stearate or stearic acid.

Suppositories are used as dosage units for rectal administration. These consist of a mixture of the active substance with a neutral fatty base. Likewise suitable for rectal administration are gelatine capsules consisting of a mixture of the active substance with polyethylene glycols of a wax-like consistency (Carbowax).

The following examples further illustrate the production of compounds of Formula I and of hitherto undescribed intermediate products as well as the production of pharmaceutical compositions, but these examples are in no way intended to limit the scope of the instant invention. All temperatures are given in degrees centigrade.

EXAMPLE 1

(i) A solution of 10 g. (0.030 mol) of 2-benzoyl-3-[2-(1-pyrrolidinyl)-ethoxy]-indole in 100 ml. of hexamethyl phosphoric acid triamide is cooled, using an ice bath, to 10° and 6.7 ml. of 30% sodium amide suspension in toluene (0.050 mol) are carefully added. A deep-red solution is immediately obtained and the temperature increases to 25°. The solution is stirred for a further 30 minutes at room temperature. It is then cooled in an ice bath and 4 g. (0.033 mol) of allyl bromide in 10 ml. of hexamethyl phosphoric acid triamide are added dropwise within 15 minutes at 5–10°. The reaction mixture is stirred for a further 15 minutes at 5–10° and then poured into a mixture of 500 ml. of ice water and 250 ml. of ether. The organic phase is separated, washed three times with 250 ml. of water each time, dried with potassium carbonate, filtered and concentrated by evaporation. The residue, a yellow oil, is dissolved in benzene, the solution filtered through 50 g. of basic aluminum oxide and the filtrate then washed with 500 ml. of benzene. The benzene solution is then concentrated by evaporation. The crude 1 - allyl - 2 - benzoyl-3-[2-(1-pyrrolidinyl)-ethoxy]-indole, which remains, is dissolved in ethyl acetate and 6 N isopropanolic chlorine-water solution is added until a congo-acid reaction is obtained. The formed hydrochloride is precipitated by addition of ether, is then filtered, separated in vacuo at 50° from residual solvent and allowed to stand under normal room conditions until constant weight is obtained. By this means 9.1 g. (71% of theoretical value) of yellow 1-allyl-2-benzoyl-3-[2-(1-pyrrolidinyl)-ethoxy]-indole hydrochloride hydrate, M.P. 100–105° are obtained.

The following are obtained inn an analogous manner from the same indole derivative starting material:

(ii) Using 3.6 g. (0.033 mol) of ethyl bromide; 1-ethyl-2-benzoyl-3-[2-(1pyrrolidinyl)-ethoxy]-indole and its hydrochloride hydrate, M.P. 107–112°;

(iii) Using 3.93 g. 0.033 mol) of 2-propinyl bromide; 1 - (2 - propinyl) - 2 - benozyl - 3 - [2 - ( 1-pyrrolidinyl)-ethoxy]-indole and its hydrochloride hydrate, M.P. 125°;

(iv) Using 4.06 g. (0.033 mol) of n-propyl bromide; 1 - propyl - 2 - benzoyl - 3 - [2-(1-pyrrolidinyl)-ethoxy-indole and its hydrochloride (dried under high vacuum at 80°), M.P. 142–143°;

(v) Using 4.06 g. (0.033 mol) of isopropyl bromide; 1-isopropyl - 2 - benzoyl - 3 - [2-(1-pyrrolidinyl)-ethoxy]-indole and its hydrochloride hydrate, M.P. 125–130°;

(vi) Using 4.52 g. (0.033 mol) of n-butyl bromide; 1-butyl - 2 - benzoyl - 3 - [2 - (1 - pyrrolidinyl)-ethoxy]-indole and its hydrochloride (dried under high vacuum at 80°), M.P. 151–154°.

The following are also produced, in an analogous manner, using other indole starting materials:

(vii) Starting with 10.1 g. (0.030 mol) of 2-benzoyl-3-(2-diethylaminoethoxy)-indole and 3.6 g. (0.033 mol) of ethyl bromide; 1 - ethyl - 2 - benzoyl-3-(2-diethylaminoethoxy)-indole and its hydrochloride, M.P. 115–120°, (dried under high vacuum for 5 hours at 80°);

(viii) starting with 10.92 g. (0.030 mol) of 2-benzoyl-3-[2-(1-pyrrolidinyl)-ethoxy]-5-methoxy-indole and 3.6 g. (0.033 mol) of ethyl bromide; 1-ethyl-2-benzoyl-3-[2-(1-pyrrolidinyl)-ethoxy]-5-methoxy-indole and its hydrochloride hydrate, M.P. 194–197°;

(ix) starting with 11.34 g. (0.030 mol) of 2-benzoyl-3-[2-(1-pyrrolidinyl)-ethoxy] - 5,6 - methylenedioxy-indole and 3.6 g. (0.033 mol) of ethyl bromide; 1-ethyl-2-benzoyl - 3 - [2-(1-pyrrolidinyl)-ethoxy]-5,6-methylenedioxy-indole and its hydrochloride (dried in high vacuum for 3 hours at 80°) M.P. 188–190°;

(x) Starting with 11.0 g. of 2-(p-methyl-benzoyl)-3-[2-(1-pyrrolidinyl)-ethoxy]-5-methyl-indole and 3.93 g. allyl-bromide, 1-allyl-2-(p-methyl-benzoyl)-3-[2-(1 - pyrrolidinyl)-ethoxy]-5-methyl-indole and its hydrochloride (M.P. 137–142°).

The 2-benzoyl - 3 - [2-(1-pyrrolidinyl)-ethoxy]-indole, used as starting material, is produced as follows:

(a) 30 g. (0.150 mol) of phenacyl bromide in 50 g. (0.330 mol) of anthranilic acid methyl ester are allowed to stand for 20 hours at 20°. The obtained crystalline mixture is heated for 2 hours to 90°, is then allowed to cool and is dissolved in 300 of absolute ethanol. A sodium ethylate solution prepared from 6.9 g. (0.30 mol) of sodium and 400 ml. of absolute ethanol is then added and the mixture refluxed for 30 minutes. The mixture is then concentrated by evaporation, the residue dissolved in 500 ml. of water and 150 ml. of methylene chloride and filtered through celite and active charcoal. The aqueous phase is then separated, extracted four times using 150 ml. of methylene chloride each time and, finally, adjusted to pH 1 with 100 ml. of 2 N hydrochloric acid. The obtained precipitate is filtered off, washed with 50 ml. of water and recrystallised from ethanol. The yield of 2-benzoyl-3-hydroxy-indole, M.P. 126°, is 65%.

In an analogous manner by reaction of 30 g. (0.150 mol) of phenacyl bromide with 59.0 g. (0.330 mol) of 5-methoxyanthranilic acid methyl ester, 2-benzoyl-3-hydroxy-5-methoxy-indole, M.P. 154°, is obtained and with 62.4 g. (0.330 mol) of 4,5 - methylenedioxy - anthranilic acid methyl ester; 2-benzoyl-3-hydroxy-5,6-methylenedioxy-indole, M.P. 215° is obtained.

The following are obtained likewise in an analogous manner:

Starting with 32.0 g. (0.150 mol) of p-methyl-phenacyl bromide and 54.5 g. (0.330 mol) of 5-methyl-anthranilic acid methyl ester; 2 - (p-methylbenzoyl) - 3 - hydroxy-5-methyl-indole, M.P. 188°.

(b) 23.7 g. (0.100 mol) of 2-benzoyl-3-hydroxy-indole are dissolved in 300 ml. of ethyl acetate, 10 ml. of water and then 28 g. (0.203 mol) of potassium carbonate are added and the mixture stirred for 10 minutes. An addition is then made at room temperature of 17.7 g. (0.104 mol) of 1-(2-chloroethyl)-pyrrolidine hydrochloride and the reaction mixture is refluxed for 15 hours while stirring. After cooling, 100 ml. of water are added, the organic phase is separated, washed three times using 100 ml. of 1 N sodium hydroxide solution each time, and then once with 100 ml. of water. The organic phase is dried over potassium carbonate, filtered and then 6 N isopropanolic chlorine-water solution is added until a congo-acid reaction is obtained. The hydrochloride of the 2-benzoyl-3-[2-(1-pyrrolidinyl)-ethoxy]-indole, which has crystallised out, is filtered off with suction, stirred into a paste three times with 100 ml. of isopropanol each time, being each time rigorously filtered with suction, and finally washed with ether. By this means are obtained 30 g. (81% of theoretical value) of pure hydrochloride, M.P. 215–217°.

To liberate the base, the hydrochloride is shaken with a slight excess of dilute sodium hydroxide solution and benzene, until two clear phases are obtained. The benzene phase is separated, dried over potassium carbonate and concentrated by evaporation in vacuo. The 2-benzoyl-3-[2-(1-pyrrolidinyl)-ethoxy]-indole, which remains, melts at 80–82° and can be directly further processed.

The following are obtained in an analogous manner:

From 23.7 g. (0.100 mol) of 2-benzoyl-3-hydroxy-indole and 17.9 g. (0.104 mol) of 2-diethylaminoethyl chloride hydrochloride; 2 - benzoyl-3-(2-diethylaminoethoxy)-indole and its hydrochloride, M.P. 162°;

From 26.7 g. (0.100 mol) of 2-benzoyl-3-hydroxy-5-methoxy-indole and 17.7 g. (0.104 mol) of 1-(2-chloroethyl)-pyrrolidine hydrochloride; 2 - benzoyl-3-[2-(1-pyrolindinyl)-ethoxy]-5-methoxy-indole and its hydrochloride, M.P. 244°;

From 28.1 g. (0.100 mol) of 2-benzoyl-3-hydroxy-5,6-methylenedioxy-indole and 17.7 g. (0.104 mol) of 1-(2-chloroethyl)-pyrrolidine hydrochloride; 2 - benzoyl-3-[2-(1 - pyrrolidinyl)-ethoxy]-5,6-methylenedioxy-indole and its hydrochloride, M.P. 240° (with decomposition);

From 25.1 g. (0.001 mol) of 2-(p-methylbenzoyl)-3-hydroxy - 5 - methyl-indole and 17.7 g. (0.104 mol) of 1 - (2-chloroethyl)-pyrrolidine hydrochloride; 2-(p-methylbenzoyl) - 3 -[2-(1-pyrrolidinyl)-ethoxy] - 5-methyl-indole and its hydrochloride, M.P. 230°.

EXAMPLE 2

(i) 2.4 g. (0.050 mol) of sodium hydride (50% suspension in mineral oil) are suspended using a mangetic stirrer in 20 ml. of absolute benzene. 10 g. (0.030 mol) of 2 - benzoyl - 3-[2-(1-pyrrolidinyl)-ethoxy]-indole [cp. Example 1(a) and (b)], dissolved in 100 ml. of hexamethyl phosphoric acid triamide, are added dropwise, while stirring, within 30 minutes at room temperature, the mixture being then stirred for a further hour at 40–50°. The obtained deep-red solution of the sodium salt of the indole derivative is cooled by means of an ice bath and a solution of 4.7 g. (0.033 mol) of methyl iodide in 10 ml. of hexamethyl phosphoric acid triamide is added dropwise, while stirring, within 15 minutes at 5–10°, whereby the colour of the reaction mixture turns yellow. After stirring for a further 15 minutes in the ice bath, the reaction mixture is poured on to 500 ml. of ice water and 250 ml. of ether. The organic phase is separated and washed three times, each time with 250 ml. of water. The organic phase is then extracted with 200 ml. of 0.2 N hydrochloric acid, the acid solution is made alkaline with ammonia and the precipitated yellow oil taken up in 250 ml. of benzene. After drying over potassium carbonate, the benzene solution is filtered through 50 g. of basic aluminum oxide, whereby traces of unmethylated product are removed. The aluminum oxide is subsequently washed with 500 ml. of benzene and the combined benzene solutions are concentrated by evaporation. The residue, i.e. the crude 1 - methyl-2-benzoyl-3-[2-(1-pyrrolidinyl)-ethoxy]-indole, is dissolved in 100 ml. of ethyl acetate and 6 N isopropanolic chlorine-water solution added to the solution until a congo-acid reaction is obtained. The hydrochloride immediately crystallises out and is filtered. It is heated in vacuo (oil pump) to 50° to remove the solvent and then allowed to stand under normal room conditions until constant weight is obtained. By this means, 9 g. (75% of theoretical value) of 1-methyl-2-benzoyl-3-[2 - (1 - pyrrolidinyl)-ethoxy]-indole hydrochloride hydrate, M.P. 127–129° are obtained.

The following are obtained in an analogous manner:

(ii) Using 10.92 g. (0.030 mol) of 2-benzoyl-3-[2-(1-pyrrolidinyl)-ethoxy]) - 5-methoxy-indole [cp. Examples 1(a) and 1(b); 1-methyl-2-benzoyl-3-[2-(1-pyrrolidinyl)-ethoxy]) - 5-methoxy-indole and its hydrochloride, M.P. 141° (dried in high vacuum at 80°);

(iii) Using 11.34 g. (0.030 mol) of 2-benzoyl-3-[2-(1-pyrrolidinyl)-ethoxy]-5,6-methylenedioxy-indole [cp. Examples 1(a) and 1(b)]; 1-methyl-2-benzoyl-3-[2-(1-pyrrolidinyl)-ethoxy]-5,6-methylenedioxy-indole and its hydrochloride, M.P. 182–185° (dried in high vacuum at 80°).

The following are also obtained in an analogous manner:

(iv) Starting with 10.44 g. (0.030 mol) of 2-benzoyl-3-(2 - piperidinoethoxy)-indole [produced analogously to Example 1(b) using 19.1 g. (0.104 mol) of 1-(2-chloro-ethyl)-piperidine hydrochloride (M.P. 226°) instead of the 1-(2-chloroethyl)-pyrrolidine hydrochloride]; 1-methyl-2-benzoyl-3-(2-piperidinoethoxy)-indole and its hydrochloride, M.P. 140–142° (dried in high vacuum at 80°);

(v) Starting with 9.24 g. (0.030 mol) of 2-benzoyl-3-(2 - dimethylaminoethoxy)-indole [produced analogously to Example 1(b) using 15.0 g. (0.104 mol) of 2-dimethylaminoethyl chloride hydrochloride (M.P. 220°) instead of the 1 - (2-chloroethyl)-pyrrolidine hydrochloride]; 1-methyl - 2-benzoyl-3-(2-dimethylaminoethoxy)-indole and its hydrochloride, M.P. 163–166° (dried in high vacuum for 3 hours at 80°).

(vi) Starting from 10.92 g. (0.030 mol) of 2-benzoyl-3-(2-dipropylamino-ethoxy)-indole (hydrochloride M.P. 112–115°) [obtained analogously to Example 1(b) using 20.8 g. (0.104 mol) of 2-di-propylamino-ethyl chloride hydrochloride in place of 1-(2-chloroethyl)-pyrrolidine hydrochloride]; 1-methyl-2-benzoyl-3-(2-di-propylamino-ethoxy)-indole and its hydrochloride melts at 172–173° (after drying under vacuum at 80°).

(vii) Starting from 11.72 g. (0.030 mol) of 2-benzoyl-3-[2-(N-methyl-butylamino)-ethoxy] - 5,6 - methylenedioxy-indole [produced analogously to Example 1(b) using 28.1 g. (0.100 mol) of 2-benzoyl-3-hydroxy-5,6-methylenedioxy-indole (see Example 1(a), M.P. 215°) and 19.4 g. (0.104 mol) of 2-(N-methyl-butylamino)-ethyl chloride hydrochloride (M.P. 203–205°)]; 1-methyl-2-benzoyl-3-[2-(N-methyl - butylamino)-ethoxy]-5,6-methylenedioxy-indole and its fumarate M.P. 157–159°.

EXAMPLE 3

The following are produced, analogously to Example 2, from the corresponding indole derivatives:

Using 11.1 g. (0.030 mol) of 2-(p-chlorobenzoyl)-3-[2-(1-pyrrolidinyl)-ethoxy]-indole; 1-methyl-2-(p-chlorobenzoyl)-3-[2-(1-pyrrolidinyl)-ethoxy]-indole and its hydrochloride, M.P. 167–169° (dried in high vacuum for 3 hours at 80°);

Using 10.4 g. (0.030 mol) of 2-(p-methylbenzoyl)-3-[2-(1-pyrrolidinyl)-ethoxy]-indole; 1-methyl-2-(p-methylbenzoyl)-3-[2-(1-pyrrolidinyl)-ethoxy]-indole and its hydrochloride dihydrate, M.P. 150–155°;

Using 11.1 g. (0.030 mol) of 2-benzoyl-3-[2-(1-pyrrolidinyl)-ethoxy]-6-chloro-indole; 1 - methyl-2-benzoyl-3-[2-(1-pyrrolidinyl)-ethoxy]-6-chloro-indole and its hydrochloride monohydrate, M.P. 138–140°;

Using 11.1 g. (0.030 mol) of 2-benzoyl-3-[2-(1-pyrrolidinyl)-ethoxy]-5-chloro-indole; 1-methyl-2-benzoyl-3-[2-(1-pyrrolidinyl)-ethoxy]-5-chloro-indole and its hydrochloride, M.P. 207–209°;

Using 11.4 g. (0.030 mol) of 2-(p-ethoxybenzoyl)-3-[2-(1-pyrrolidinyl)-ethoxy] - 5 - methyl-indole; 1,5-dimethyl - 2 - (p - ethoxybenzoyl)-3-[2-(1-pyrrolidinyl)-ethoxy]-indole and its hydrochloride, M.P. 174–175°;

Using 11.2 g. (0.030 mol) of 2-benzoyl-3-[2-(1-pyrrolidinyl)-ethoxy]-6-methoxy-indole; 1-methyl-2-benzoyl-3-[2-(1-pyrrolidinyl)-ethoxy]-6-methoxy-indole and its hydrochloride, M.P. 177–180°.

The indole derivatives, required as starting materials, are obtained as follows:

(a) The following are reacted analogously to Example 1(a):

35.1 g. (0.15 mol) of p-chlorophenacyl bromide with 50 g. (0.33 mol) of anthranilic acid methyl ester to give 2-(p-chlorobenzoyl)-3-hydroxy-indole, M.P. 168°;

32.0 g. (0.15 mol) of p-methylphenacyl bromide with 50 g. (0.33 mol) of anthranilic acid methyl ester to give 2-(p-methylbenzoyl)-3-hydroxy-indole, M.P. 150–153°;

30.0 g. (0.15 mol) of phenacyl bromide with 62.0 g. (0.33 mol) of 4-chloro-anthranilic acid methyl ester to give 2-benzoyl-3-hydroxy-6-chloro-indole, M.P. 159–161; 30.0 g. (0.15 mol) of phenacyl bromide with 62.0 g. (0.33 mol) of 5-chloroanthranilic acid methyl ester to give 2-benzoyl-3-hydroxy-5-chloro-indole, M.P. 142°;

36.4 g. (0.15 mol) of p-ethoxyphenacyl bromide with 54.5 g. (0.33 mol) of 5-methylanthranilic acid methyl ester to give 2-(p-ethoxybenzoyl)-3-hydroxy-5-methyl-indole, M.P. 187°;

30.0 g. (0.15 mol) of phenacyl bromide with 59.8 g. (0.33 mol) of 4-methoxyanthranilic acid methyl ester to give 2-benzoyl-3-hydroxy-6-methoxy-indole, M.P. 197–199°.

(b) Analogously to Example 1(b), 17.7 g. (0.104 mol) of 1-(2-chloroethyl)-pyrrolidinyl hydrochloride are reacted:

With 27.2 g. (0.10 mol) of 2-(p-chlorobenzoyl)-3-hydroxy-indole to give 2-(p-chlorobenzoyl)-3-[2-(1-pyrrolidinyl)-ethoxy]-indole and its hydrochloride, M.P. 240°;

With 25.1 g. (0.10 mol) of 2-(p-methylbenzoyl)-3-hydroxy-indole to give 2-(p-methylbenzoyl)-3-[2-(1-pyrrolidinyl)-ethoxy]-indole and its hydrochloride, M.P. 242°;

With 27.2 g. (0.10 mol) of 2-benzoyl-3-hydroxy-6-chloro-indole to give 2-benzoly-3-[2-(1-pyrrolidinyl)ethoxy]-6-chloro-indole and its hydrochloride, M.P. 225° (decomposition);

With 27.2 g. (0.10 mol) of 2-benzoyl-3-hydroxy-5-chloroindole to give 2-benzoyl-3-[2-(1-pyrrolidinyl)-ethoxy]-5-chloro-indole and its hydrochloride, M.P. 229°;

With 29.5 g. (0.10 mol) 2-(p-ethoxybenzoyl)-3-hydroxy-5-methyl-indole to give 2-(p-ethoxybenzoyl)-3-[2-(1-pyrrolidinyl)-ethoxy]-5-methyl-indole and its hydrochloride, M.P. 207°;

With 26.6 g. (0.10 mol) 2-benzoyl-3-hydroxy-6-methoxy-indole to give 2-benzoyl-3-[2-(1-pyrrolidinyl)-ethoxy]-6-methoxy-indole and its hydrochloride, M.P. 177–180°.

EXAMPLE 4

14.8 g. (0.035 mol) of 2-(p-ethoxybenzoyl)-3-(2-diethylamino-ethoxy)-5,6-methylenedioxy-indole are dissolved in 100 ml. of hexamethyl-phosphoric acid-triamide with stirring (magnetic stirrer) and cooling in an ice bath to 5°. To this solution is added a suspension of 3 g. (0.077 mol) of sodium amide in 10 ml. of toluene and the temperature rises to 15°. The obtained deep red solution is stirred for a further 30 minutes at 30–35°. It is then cooled in an ice bath to 15–20° and a solution of 4.3 g. (0.040 mol) of acetyl bromide in 25 ml. of hexamethyl-phosphoric acid-triamide is added dropwise and the colour of the reaction mixture changes to yellow. After stirring for a further 30 minutes at 30°, the reaction mixture is added to 500 ml. of iced water and 250 ml. of ether. The organic phase is separated and then washed 5 times with 250 ml. of water each time, dried over potassium carbonate and the ether evaporated. The remaining yellow oil is dissolved in 500 ml. of benzene and filtered through 100 g. of basic aluminum oxide which retains the traces of the starting material. The aluminum oxide is then washed with 500 ml. of benzene and the combined benzene solutions evaporated. The remaining 1-ethyl-2-(p-ethoxy-benzoyl) - 3 - (2-diethylaminoethoxy)-5,6-methylenedioxy-indole is dissolved in 200 ml. of ethyl and made acid to congo red with a 6 N solution of hydrogen chloride in isopropanol. The hydrochloride crystallises on the addition of 100 ml. of ether. It is filtered off, washed with ether, and dried at 70° in high vacuum, 13.2 g. (77% of theoretical value) of 1-ethyl-2-(p-ethoxy-benzoyl)-3-(2-diethylamino - ethoxy)-5,6-methylenedioxy-indole hydrochloride are obtained M.P. 188–190°.

In an analogous way, from 2.12 g. (0.005 mol) of the same starting materials and 0.78 g. of methyliodide, 1-methyl-2-(p-ethoxybenzoyl)-3-(2-diethylamino - ethoxy)-5,6-methylenedioxy-indole-hydrochloride-hydrate is obtained, M.P. 145–148° (free base, M.P. 75–78°).

The starting material is prepared as follows:

(a) 41 g. (0.2 mol) of 4,5-methylenedioxy-anthranilic acid methyl ester are dissolved at 60° in 50 ml. of diethyleneglycol-dimethylether and 24.3 g. (0.1 mol) of p-ethoxy-phenacylbromide is added with stirring (magnetic stirrer). The clear, highly viscous solution is stirred at 60°, crystallisation begins after 10 minutes and after one hour, it is no longer possible to stir the mixture. When the reaction is almost completed, the reaction mixture is heated to 90–100° for 2 hours and then boiled under reflux with 250 ml. of absolute dioxane. The insoluble 4,5 - methylenedioxy - anthranilic acid-methyl-ester-hydrobromide is filtered under suction whilst hot and extracted again with 250 ml. of boiling absolute dioxane. The combined dioxane extracts are evaporated and the raw product washed 3 times with 150 ml. of methanol each time. After drying, 27.4 g. (78% of theory) of N-(p-ethoxyphenacyl) - 4,5 - methylenedioxy-anthranilic acid methylester is obtained, M.P. 172–174°.

(b) 27.4 g. (0.07 mol) of N-(p-ethoxyphenacyl)-4,5-methylenedioxy-anthranilic acid methylester are suspended in 700 ml. of boiling absolute ethanol with stirring under reflux and in a dry atmosphere of nitrogen. A solution of 1.9 g. (0.083 mol) of sodium in 100 ml. of absolute ethanol is added. After 5 minutes under reflux, a clear dark solution is obtained which is boiled for a further 10 minutes. 100 ml. of 1 N hydrochloric acid is then added and the mixture immediately cooled in an ice bath. The crystalline product is filtered under suction and washed twice with 100 ml. of ice cold 80% ethanol each time. After drying, 22.4 g. (90% of theoretical value) of 2-(p-ethoxybenzoyl)-3-hydroxy-5,6-methylenedioxy-indole is obtained as fine golden yellow crystals, M.P. 202–205°.

(c) 26.3 g. (0.08 mol) of 2-(p-ethoxybenzoyl)-3-hydroxy-5,6-methylenedioxy-indole are dissolved in 800 ml. of methyl acetate and added to 25 ml. of water, 22.4 g. (0.16 mol) of potassium carbonate and 14.6 g. (0.085 mol) of 2-diethylamino-ethyl-chloride-hydrochloride at room temperature with stirring. The mixture is boiled for 15 hours under refluxing with stirring. After cooling to room temperature, the mixture is filtered with activated charcoal carbon and the clear dark ethyl acetate is separated from the filtrate and washed 3 times with 500 ml. of 0.4 N sodium hydroxide solution in a separating funnel. Then, it is extracted twice with 500 ml. of 0.4 N hydrochloric acid and the combined acid extracts are washed once with ethyl acetate. After making alkaline with 2 N sodium hydroxide, the precipitated base is taken up in 500 ml. of chloroform. This chloroform solution washed once with 100 ml. of water, dried over potassium carbonate, filtered and evaporated. The raw residue is dissolved in 250 ml. of boiling benzene cyclohexane 1:1 and 250 ml. of hexane slowly added. 29 g. (84% of theoretical value) of 2-(p-ethoxybenzoyl)-3-(2-diethyl-aminoethoxy)-5,6-methylenedioxy-indole crystallises out, M.P. 121–123°.

EXAMPLE 5

4.22 g. (0.01 mol) of 2-(p-ethoxybenzoyl)-3-[2-(1-pyrrolidinyl)-ethoxy]-5,6-methylenedioxy-indole are dissolved in 50 ml. of hexamethyl-phosphoric acid-triamide with stirring (magnetic stirrer) and cooled to 5° in an ice bath. To this solution is added a suspension of 900 mg. (0.023 mol) of sodium amide in 3 ml. of toluene and the resulting deep red solution is stirred for 30 minutes at 30–35°. The reaction solution is then cooled in an ice bath at a temperature of 10–20°, a solution of 1.23 g. (0.01 mol) of dimethyl sulfate in 5 ml. of toluene is added dropwise within 10 minutes. After a further 30 minutes stirring at 30°, the reaction mixture is poured into 250 ml. of ice water and 250 ml. of ether. The organic phase is separated and washed 5 times with 250 ml. of water each time, dried over potassium carbonate and evaporated. The crystalline residue of crude-methyl-2-(p-ethoxybenzoyl)-3-[2-(1-pyrrolidinyl) - ethoxy]-5,6-methylenedioxy indole, M.P. 97–99° is dissolved in 100 ml. of ethyl acetate and is made acid to congo red with a 6 N solution of hydrogen chloride in isopropanol. The hydrochloride crystallises on the addition of 20 ml. of ether which is filtered and heated to 50° in a vacuum to remove the solvents. The solid is then left under room conditions until a constant weight is obtained. 4 g. (85% of theoretical value) of 1-methyl-2-(p-ethoxybenzoyl)-3-[2-(1-pyrrolidinyl)-ethoxy] - 5,6 - methylenedioxy indole hydrochloride monohydrate M.P. 148–152° is obtained.

The required starting material is prepared as follows:

13 g. (0.040 mol) of 2-(p-ethoxybenzoyl)-3-hydroxy-5,6-methylenedioxy-indole (cf. Example 4(a) and (b) is dissolved at 60° with stirring in 400 ml. of ethyl acetate and added to 11 ml. of water, 11.1 g. of potassium carbonate (0.08 mol) and 7.15 g. (0.042 mol) of 2-(1-pyrrolidinyl)-ethylchloride-hydrochloride. The reaction mixture is boiled for 20 hours under reflux with stirring. After cooling to room temperature, the dark ethyl acetate solution is filtered with activated charcoal carbon and washed in a separating funnel twice with 200 ml. of 0.5 N sodium hydroxide solution each time and once with 100 ml. of water. The solution is then made acid to congo red with 6 N solution of hydrogen chloride in isopropanol at which point the hydrochloride of 2-(p-ethoxybenzoyl)-3-[2-(1-pyrrolidinyl) - ethoxy]-5,6-methylenedioxy-indole crystallises out. It is filtered under suction and washed 3 times with 50 ml. of isopropanol ethyl acetate 1:1. The hydrochloride is suspended in 250 ml. of 1 N sodium hydroxide solution and 500 ml. of chloroform and stirred with a magnetic stirrer until a clear 2-phased solution is obtained. The chloroform solution is separated, washed twice with 100 ml. of water each time and then dried over potassium carbonate. After evaporation, there remain 13.2 g. (78% of theoretical value) of 2-(p-ethoxybenzoyl)-3-[2 - (1 - pyrrolidinyl)-ethoxy]-5,6-methylenedioxy-indole, M.P. 122–128.

EXAMPLE 6

To a solution of 17.6 (0.070 mol) of 1 - methyl - 2-benzoyl-3-hydroxy-indole in 500 ml. of ethyl acetate and 10 ml. of water are added 19.0 g. (0.140 mol) of potassium carbonate and, followed after 10 minutes stirring at room temperature, by 12.5 g. (0.0735 mol) of 1-(2-chloro-ethyl)-pyrrolidine hydrochloride. The mixture is refluxed for 15 hours while stirring. After cooling, it is washed once with 250 ml. of water and twice with, each time, 250 ml. of 1 N sodium hydroxide solution. It is then extracted twice with 250 ml. of 0.5 N hydrochloric acid each time. The combined acid extracts are washed once with ether, then made alkaline with ammonia and the precipitated oil taken up in 250 ml. of benzene. After washing with water and drying over potassium carbonate, the benzene solution is filtered through 100 g. of basic aluminum oxide and the aluminum oxide subsequently washed with 1000 ml. of benzene. The benzene solution is concentrated by evaporation, the obtained crude 1-methyl-2-benzoyl-3-[2-(1-pyrrolidinyl)-ethoxy] - indole dissolved in 200 ml. of ethyl acetate and a 6 N solution of hydrogen chloride in isopropanol is added to the solution until acid to congo red. The precipitated yellow hydrochloride is filtered off, separated from the residual solvent by heating to 50° in vacuo and then allowed to stand under normal room conditions until constant weight is attained. The thus obtained 1 - methyl-2-benzoyl-3-[2-(1-pyrrolidinyl)-ethoxy]-indole hydrochloride hydrate melts at 127–129°, yield 18.1 g. (64% of theoretical value).

The 1-methyl-2-benzoyl-3-hydroxy-indole, used as starting material, is produced as follows:

7.0 g. (0.424 mol) N-methylanthranilic acid methyl ester and 4.0 g. (0.020 mol) phenacyl bromide are mixed and the solution thus obtained is stirred (magnetic stirrer) at a temperature of 30–40°. After 48 hours the thick paste is dissolved in 100 ml. methanol, heated to boiling under reflux and to this solution is added a solution of 920 mg. sodium in 50 ml. of methanol. The dark red solution is heated for a further 10 minutes under reflux and evaporated in vacuo.

The residue is dissolved in 100 ml. water and washed neutral 3 times with 50 ml. ether each time. The red aqueous solution is made acid to congo red with 2 N hydrochloric acid, the precipitate filtered under suction and washed neutral with water. After drying in a dessicator over phosphorus pentoxide and recrystallisation from 300 ml. hexane, 3.2 g. (64%) 1-methyl-2-benzoyl-3-hydroxy-indole, M.P. 110–113° are obtained.

EXAMPLE 7

3.4 g. (0.010 mol) of 1-methyl-2-(p-ethoxy-benzoyl)-3-hydroxy-5,6-methylenedioxy-indole, dissolved in 100 ml. ethyl acetate are stirred (magnetic stirrer) at room temperature, with 2.76 g. (0.020 mol) potassium carbonate dissolved in 3 ml. water and after 10 minutes 1.9 g. (0.011 mol) of 2 - diethylamino-ethyl chloride hydrochloride is added and the resulting mixture is boiled under reflux for 10 hours. After cooling to room temperature the ethyl acetate solution is first extracted 3 times with 100 ml. of 1 N sodium hydroxide solution each time and then extracted 3 times with 100 ml. 1 N hydrochloric acid each time in order to remove traces of the starting material. The combined acid extracts are made alkaline with ammonia. The precipitated base is dissolved in 100 ml. benzene, the benzene phase separated and washed with a solution of potassium carbonate.

After evaporation of the benzene there remain 3.9 g. (89%) of 1-methyl - 2 - (p-ethoxybenzoyl)-3-(2-diethyl-aminoethoxy)-5,6-methylenedioxy-indole, M.P. 75–78°.

This base is converted in the normal way analogously to Example 6 to the hydrochloride. This hydrochloride is dried under normal conditions to constant weight, and 1-methyl - 2 - (p-ethoxybenzoyl)-3-(2-diethylaminoethoxy)-5,6 - methylenedioxy-indole hydrochloride monohydrate, M.P. 146–148° is thus obtained.

In an analogous manner 1-ethyl-2-(p-ethoxybenzoyl)-3-(2-diethylaminoethoxy) - 5,6 - methylenedioxy-indole hydrochloride, M.P. 188–190°, and 1 - methyl-2-(p-ethoxybenzoyl)-3-[2-(1-pyrrolidinyl)-ethoxy] - 5,6 - methylenedioxy-indole-hydrochloride monohydrate, M.P. 148–151° are obtained.

The required starting materials, 1-methyl-2-(p-ethoxybenzoyl)-3-hydroxy-5,6 - methylenedioxy-indole and the corresponding 1-ethyl compound, are obtained as follows.

2.8 g. (0.012 mol) of N-methyl-4,5-methylene-dioxy anthranilic acid methyl ester are dissolved in 3 ml. diethyleneglycol dimethyl ether and 1.4 g. (0.058 mol) of p-ethoxyphenacyl bromide is added at 30–40°. The resulting viscous solution is stirred (magnetic stirrer) for 60 hours at 30–40°, dissolved in 20 ml. absolute ethanol, boiled under reflux and a solution of 276 mg. sodium in 10 ml. absolute ethanol is added. The resulting dark red solution is boiled under reflux for 10 minutes and poured whilst still hot into 200 ml. ice water.

The undissolved portion is removed by twice extracting with 100 ml. ether each time and the red alkaline solution remaining is acidified with 2 N hydrochloric acid. The brown precipitate is filtered under suction, washed with water and after recrystallisation from 100 ml. ethanol, 1.35 g. (70%) yellow crystals of 1 - methyl-2-(p-ethoxybenzoyl)-3-hydroxy - 5,6 - methylene-dioxy-indole M.P. 136–140° are obtained.

Analogously from 3.0 g. (0.013 mol) N-ethyl-4,5-methylenedioxy anthranilic acid ethyl ester, 1 - ethyl - 2-(p-ethoxybenzoyl)-3-hydroxy - 5,6 - methylenedioxy indole, M.P. 117–121° is obtained.

EXAMPLE 8

2.65 g. (0.010 mol) of 1-methyl-2-benzoyl-3-methoxy-indole are added to a solution of 240 mg. (0.010 mol) of sodium hydride in 20 ml. of 2-(dimethylamino)-ethanol. After addition of 50 ml. of absolute toluene, the reaction mixture is heated to gentle boiling in a distilling apparatus with Vigreux column during 24 hours in such a manner that the temperature at the head of the column is 60–70°. The solution becomes dark and a little distillate is obtained. After cooling, 50 ml. of ether are added and the dark solution is washed five times with each time 500 ml. of water. The ether solution is then extracted twice, each time with 100 ml. of 1 N hydrochloric acid. The acid extracts are made alkaline with ammonia and extracted with ether, the ether solution is washed with water, dried with potassium carbonate and concentrated by evaporation. The residue is dissolved in 50 ml. of ethyl acetate made acid to a congo-red indicator using 6 N isopropanolic hydrochloric acid solution and the formed 1-methyl-2 - benzoyl-3-(2-dimethylaminoethoxy)-indole hydrochloride is precipitated with ether and dried in high vacuum at 80°, M.P. 163–166°.

The 1-methyl-2-benzoyl-3-methoxy indole, required as starting material, is produced as follows:

(a) 63 g. (0.266 mol) of 2-benzoyl-3-hydroxy-indole [cp. Example 1a] are dissolved in 400 ml. of hexamethyl phosphoric acid triamide. While stirring and cooling with ice, 14.6 g. (0.270 mol) of sodium methylate in 150 ml. of absolute methanol are added dropwise at ca. 10°, whereupon the mixture is stirred for a further 30 minutes at room temperature. At ca. 10°, 34.3 g. (0.272 mol) of dimethyl sulfate in 100 ml. of methanol are then added dropwise. The reaction mixture is subsequently stirred for 2 hours at room temperature, whereby a crystalline product precipitates. The reaction mixture is then stirred for a further 2 hours at 60°, whereby all of the substance again goes into solution. After cooling, the reaction mixture is poured on to 1000 ml. of ice water and the precipitated crude product taken up in 1000 ml. of ether. The ether phase is repeatedly washed with water, dried over sodium sulfate and concentrated by evaporation over sodium sulfate. The residue is recrystallised from methylene chloride hexane, whereby 55 g. (82% of theoretical value) of 2-benzoyl-3-methoxy-indole are obtained as yellow needles, M.P. 143–144°.

(b) 3 g. (0.125 mol) of sodium hydride are dissolved in 50 ml. of hexamethyl phosphoric acid triamide and, while stirring, 25.1 g. (0.100 mol) of 2-benzoyl-3-methoxy-indole in 100 ml. of hexamethyl phosphoric acid triamide are added dropwise at ca. 20°. The mixture assumes a deep-red colour with an intense evolution of hydrogen. After this evolution of gas has ceased, the mixture is stirred for a further 2 hours at 60°. After cooling to 10°, 18 g. (0.127 mol) of methyl iodide are added dropwise, while cooling with ice and within one hour. The reaction mixture is then stirred for a further hour at 40°, whereby a colour change to yellow occurs. The reaction mixture is cooled and poured on to 1000 ml. of ice water, the precipitated oil taken up in 500 ml. of ether, the ether solution repeatedly washed with water and dried over sodium sulfate. After distilling off the ether, the residue is distilled in high vacuum. The 1-methyl-2-benzoyl-3-methoxy-indole distills at 180–190°/0.1 torr and condenses as a light-yellow oil. Yield 22 g. (83% of theoretical value).

EXAMPLE 9

530 g. (0.002 mol) of 1-methyl-2-benzoyl-3-methoxy-indole are dissolved in 4.6 g. (0.040 mol) of 2-(1-pyrrolidinyl)-ethanol and with stirring (magnetic stirrer) 24 mg. of sodium hydride (50% suspension in mineral oil) are added. The reaction mixture is distilled for one hour at a bath temperature of 170–180° in a slow of nitrogen. The excess of the 2-(1-pyrrolidinyl)-ethanol is evaporated in vacuo and residue, after cooling, is dissolved in 100 ml. 1 N hydrochloric acid.

After filtration with charcoal through hyflo the filtrate is made alkaline with aqueous ammonia. The precipitated base is dissolved in 50 ml. benzene, the benzene phase separated and washed 3 times with 50 ml. water each time. After drying over potassium carbonate the benzene solution is filtered through 10 g. basic aluminum oxide and this is washed with 50 ml. benzene. The combined benzene solutions are concentrated and the reaction product, an oily residue, is converted in ethyl acetate to the hydrochloride with a 6 N solution of hydrogen chloride in isopropanol. 580 g. (72%) of 1-methyl-2-benzoyl-3-[2-(1 - pyrrolidinyl)-ethoxy]-indole-hydrochloride monohydrate M.P. 127–129° are obtained.

EXAMPLE 10

18.5 mg. sodium are dissolved in 4.7 g. 2-diethylaminoethanol and this solution is added to 706 mg. (0.002 mol) of 1-methyl-2-(p-ethoxy-benzoyl)-3-methoxy-5,6-methylenedioxy indole (cp (a)). The clear yellow solution is distilled with stirring (magnetic stirrer) for one hour at a bath temperature of 170° under a slow stream of nitrogen. Under these conditions the reaction mixture becoms dark coloured and about 1 ml. of a mixture of methanol and 2-diethylamino-ethanol distills over. The remaining 2-diethylamino-ethanol is distilled in vacuo and the residue, after cooling, dissolves in 100 ml. 1 N hydrochloric acid. The acid/aqueous solution is filtered with charcoal through Hyflo, made alkaline with aqueous ammonia and the precipitated base dissolved in 50 ml. benzene. The organic phase is separated and washed 3 times with 50 ml. water each time, dried over potassium carbonate and then filtered through 15 g. basic aluminum oxide. After concentration, the yellow eluate, 420 mg. (48%) 1-methyl-2-(p-ethoxybenzoyl)-3-(2-diethylamino-ethoxy)-5,6 - methylenedioxy indole M.P. 24–25° is obtained.

This base is converted in ethyl acetate to the hydrochloride by acidifying with 6 N hydrogen chloride in isopropanol until acid to congo red and the M.P. of the hydrochloride monohydrate is 145–148°.

In an analogous manner are obtained 1-methyl-2-(p-ethoxybenzoyl)-3-[2 - (1 - pyrrolidinyl) - ethoxy] - 5,6-methylene-dioxy indole and its hydrochloride monohydrate, M.P. 148–152° starting from 4.6 g. 2 - (1 - pyrrolidinyl)-ethanol and 706 mg. 1-methyl-2-(p-ethoxy-benzoyl)-3-methoxy-5,6-methylene-dioxy indole, 1-ethyl-2-($\mu$-ethoxy-benzoyl)-3-(2 - diethylamino - ethoxy) - 5,6-methylene-dioxy indole and its hydrochloride, M.P. 188–190° starting from 4.7 g. of 2-diethylamino-ethanol and 734 mg. 1-ethyl-2-(p-ethoxy-benzoyl)-3 - methoxy - 5,6-methylene-dioxy indole (obtained analogously to Example 8a) using 1-ethyl-2-(p-ethoxy-benzoyl)-3-hydroxy - 5,6-methylene-dioxy indole, M.P. 117–121°.

The required starting material, 1-methyl-2-(p-ethoxybenzoyl) - 3 - methoxy - 5,6 - methylenedioxy - indole is prepared as follows:

6.5 g. (0.02 mol) of 2-(p-ethoxy-benzoyl)-3-hydroxy-5,6-methylenedioxy-indole is dissolved in 100 ml. of hexamethylphosphoric acid triamide and mixed at 10–20 with 3.1 g. (0.08 mol) of sodium amide (suspension in 10 ml. of toluol). After 30 minutes, 2.5 g. (0.02 mol) of dimethyl sulfate in 5 ml. of toluene is added dropwise within 10 minutes and then heated for one hour at 40–50°. The mixture is then cooled on an ice bath and a further 2.9 g. (0.023 mol) of dimethyl sulfate in 5 ml. toluene is added dropwise at 5–10° within 10 minutes. The reaction mixture is stirred for a further one hour at room temperature, poured into 500 ml. of iced water and 250 ml. of benzene, the organic phase is separated, and washed 5 times with 250 ml. of water each time. After drying over potassium carbonate, the benzene solution is filtered through 100 g. of basic aluminum oxide and this is then washed with 500 ml. of benzene. The combined yellow benzene solutions are evaporated and the yellow residue is crystallised from 100 ml. of methanol. 4.8 g. (68%) of 1-methyl-2-(p-ethoxybenzoyl)-3-methoxy-5,6-methylene-dioxy-indole, M.P. 138–140° is obtained.

EXAMPLE 11

23 mg. (0.001 mol) of sodium is dissolved in 8 g. (0.07 mol) of 2-(1-pyrrolidinyl)-ethanol at 80° and this solution is added to 1.42 g. (0.004 mol) of 1-methyl-2-(p-isopropoxybenzoyl) - 3 - isopropoxy - 5,6 - methylene-dioxy-indole. The yellow solution obtained is heated on a bath at 170° with stirring (magnetic stirrer) for 2 hours in a slow stream of nitrogen and then gradually cooled. 2he isopropanol distills with a little 2-(1-pyrrolidinyl)-ethanol and the reaction mixture becomes dark. The excess 2-(1-pyrrolidinyl)-ethanol is distilled off in vacuo and the dark brown residue is dissolved in 100 ml. of ether. The ether solution is washed three times with 100 ml. of water each time, and then extracted twice with 100 ml. of ice cold 0.2 N hydrochloric acid each time. The combined acid extracts are made alkaline with ammonia and the base which precipitates as a yellow oil is taken up in 100 ml. of benzene. After drying with potassium carbonate, and evaporation of the benzene, there remains 1.1 g. of a yellow brown oil which is dissolved in 50 ml. of cyclohexane, filtered through 15 g. of basic oxide and which is then washed with 50 ml. of cyclohexane, the combined yellow solutions are evaporated. The light yellow very viscous oil, 1-methyl-2-(p-isopropoxybenzoyl) - 3 - [2 - (1 - pyrrolidinyl) - ethoxy] - 5,6-methylenedioxy-indole, is dissolved in 10 ml. of ethylacetate and neutralised with 6 N hydrogen chloride solution in isopropanol. After adding a little ether, the hydrochloride crystallises. It is filtered off and washed with a little ethyl acetate. 800 mg. (44% of theoretical value) of 1 - methyl - 2 - (p - isopropoxybenzoyl) - 3 - [2-(1 - pyrrolidinyl) - ethoxy] - 5,6 - methylenedioxy-indole-hydrochloride hydrate, M.P. 142–145° is thus obtained.

The indole derivative required as starting material is prepared as follows:

(a) 5.85 g. (0.028 mol) of N-methyl-4,5-methylenedioxyanthranilic acid methyl ester is dissolved in 10 ml. of warm diethyleneglycol-dimethyl ether and 4.3 g. of p-hydroxy-phenacylbromide is added with stirring at 30° (magnetic stirrer). The suspension is stirred for 24 hours at 30° and then heated to 60° and the resulting solution stirred for a further 24 hours at 60°. The obtained base which is no longer possible to stir is dissolved in 500 ml. of boiling ethanol and mixed with a solution of 3.24 g. (0.06 mol) of sodium methylate in 100 ml. of methanol. The deep red reaction solution is boiled for a further 10 minutes under reflux, then cooled with an ice bath and acidified with 10 ml. of concentrated aqueous hydrochloric acid. The solution is then concentrated to about 50 ml. in vacuo, added to 500 ml. of iced water and then made strongly alkaline by the addition of 2 N sodium hydroxide solution. To remove the undissolved solid, the solution is filtered with carbon through hyflo and the clear red filtrate is acidified with 2 N hydrochloric acid. The brown yellow precipitate is filtered and washed with water. After recrystallisation from ethanol water, 2.8 g. (45% of theoretical value) of 1-methyl-2-(p-hydroxybenzoyl) - 3 - hydroxy - 5,6 - methylenedioxy - indole, M.P. 193–196° is obtained as yellow crystals.

(b) 720 mg. (0.015 mol) of sodium hydride (as 50% suspension in mineral oil) is suspended in 10 ml. of absolute benzene and heated to 50–60° with stirring (magnetic stirrer). At this temperature, a solution of 2.1 g. (0.007 mol) of 1 - methyl - 2 - (p - hydroxy - benzoyl)-3 - hydroxy - 5,6 - methylenedioxy - indole in 100 ml. of hexamethyl-phosphoric acid-triamide is added dropwise within 15 minutes. After stirring for a further 30 minutes at 50–60° the production of hydrogen ceases and after cooling, with an ice bath, to 5–10°, 3.4 g. (0.02 mol) of isopropyl iodide in 5 ml. hexamethyl-phosphoric acid-triamide is added dropwise within 10 minutes and the reaction mixture further stirred for 15 hours at 30–35°. The reaction mixture is then poured into a mixture of 500 ml. of iced water and 250 ml. of ether, the organic phase separated and washed 3 times with 250 ml. of water each time. The yellow ether solution is then washed 3 times with 100 ml. of ice cold 0.1 N sodium hydroxide solution each time, then once with 100 ml. of water and dried over sodium sulfate. After evaporation of the ether, the residual yellow oil is dissolved in 10 ml. of cyclohexane and chromatographed on 100 g. of basic aluminum oxide. The mineral oil is firstly washed out with cyclohexane and the reaction product is then eluted with benzene ether 3:1. After the evaporation of the benzene ether solution, 1-methyl-2-(p-isopropoxybenzoyl)-3-isopropoxy-5,6-methylenedioxy indole is obtained as a yellow, highly viscous oil (1.5 g., 56% of theory) and is used without further purification in the next step.

EXAMPLE 12

314 mg. (0.001 mol) of 1-methyl-2-benzoyl-3-(2-chloro-ethoxy)-indole are boiled under reflux on a steam bath for 3 hours with 730 mg. (0.01 mol) of diethylamine. The excess diethylamine is removed by evaporation in vacuo, the residue dissolved in 50 ml. of 1 N hydrochloric acid and filtered with carbon through hyflo. The light yellow filtrate is made alkaline with concentrated aqueous ammonia and the precipitated base is taken up in 50 ml. of benzene. The organic phase is separated and washed 5 times with 50 ml. of water each time, dried with potassium carbonate and evaporated. The residue, crude 1 - methyl-2-benzoyl-3-(2-diethylamino-ethoxy)-indole, is dissolved in 20 ml. of ethylacetate and made acid to congo red with a 6 N solution of hydrogen chloride in isopropanol. Upon the addition of ether, the benzoyl hydrochloride precipitates and is dried at 70° in vacuo, M.P. 146–150°.

In an analogous manner, using 710 mg. (0.01 mol) of pyrrolidine, 1-methyl - 2 - benzoyl-3-[2-(1-pyrrolidinyl)- ethoxy]-indole-hydrochloride is prepared, M.P. 127–129°.

Similarly, in an analogous manner, the following are prepared by the reaction of:

(a) 415 mg. (0.001 mole) of 1-ethyl-2-(p-ethoxybenzoyl)-3-(2-chloroethoxy)-5,6-methylenedioxy - indole with 730 mg. (0.01 mol) diethylamine;. 1-ethyl-2-(p-ethoxybenzoyl)-3-(2-diethylaminoethoxy) - 5,6 - methylenedioxy-indole and its hydrochloride, M.P. 188–190°;

(b) 401 mg. (0.001 mole) of 1-methyl-2-(p-ethoxybenzoyl)-3-(2-chloroethoxy) - 5,6 - methylenedioxy-indole with 730 mg. (0.01 mol) diethylamine, 1-methyl-2-(p-ethoxybenzoyl)-3-(2-diethylamino-ethoxy) - 5,6 - methylenedioxy-indole and its hydrochloride, M.P. 145–148°; and (c) 401 mg. (0.001 mole) of 1-methyl-2-(p-ethoxybenzoyl)-3-(2-chloroethoxy)-5,6-methylenedioxy indole with 710 mg. (0.01 mol) pyrrolidine; 1-methyl-2-(p-ethoxybenzoyl)-3-[2-(1-pyrrolidinyl) - ethoxy]-5,6-methylenedioxy indole and its hydrochloride, M.P. 148–152°.

The 1-methyl-2-benzoyl-3-(2-chloroethoxy)-indole required as starting material is prepared as follows:

290 mg. (0.006 mol) of sodium hydride (50% suspension in mineral oil) is suspended in 2 ml. of absolute benzene with stirring (magnetic stirrer). 1 g. (0.004 mol) of 1-methyl-2-benzoyl-3-hydroxy-indole dissolved in 30 ml. of hexamethylphosphoric acid-triamide is then added dropwise, within 10 minutes, with ice cooling at 5–10°. After a further 30 minutes stirring, 1 g. (0.007 mol) of 1-bromo-2-chloro-ethane dissolved in 5 ml. of hexamethyl-phosphoric acid-triamide is added dropwise. The reaction mixture is then stirred for 30 minutes at 5–10°, a further 30 minutes at 30–40° and finally, a further 30 minutes at 70–80°. After cooling, the reaction mixture is poured into 250 ml. of iced water and 100 ml. of ether. The organic phase is separated and washed 3 times with 50 ml. of water each time. The organic phase is then extracted 3 times with 100 ml. of 0.1 N sodium hydroxide solution each time and if all the starting material is not removed, it is washed once more wih 50 ml. of water and then the light yellow solution is dried with sodium sulfate. After evaporating the solvents, the remaining yellow oil is dissolved in 2 ml. of cyclohexane and chromatographed in 50 g. of kiesel gel. The resulting kiesel gel is first eluted with hexane to remove the remaining mineral oil. By further elution with benzene cyclohexane, the 1-methyl-2-benzoyl-3-(2-chloroethoxy) - indole is obtained as a light yellow viscous oil which crystallises after remaining for a few days in a refrigerator, M.P. 54–56°.

In an analogous way, using 141 g. (0.004 mol) of 1-ethyl-2-(p-ethoxybenzoyl)-3-hydroxy - 5,6 - methylenedioxy-indole, M.P. 117–121°, 1-ethyl-2-(p-ethoxybenzoyl)-3-hydroxy - 5,6 - methylenedioxy-indole is obtained, M.P. 121–125° and using 1.36 g. (0.004 mol) of 1-methyl-2-(p-ethoxybenzoyl)-3-hydroxy - 5,6 - methylenedioxy-indole, M.P. 136–140°, 1-methyl-2-(p-ethoxybenzoyl)-3-(2-chloroethoxy)-5,6-methylenedioxy indole is obtained.

EXAMPLE 13

142 mg. of 1-methyl-2-benzoyl-3-(2-chloroethoxy)-5,6-methylenedioxy-indole and 284 mg. (0.004 mol) of pyrrolidine are boiled under reflux for an hour in a steam bath. The excess pyrrolidine is evacuated in vacuo, the residue dissolved in 10 ml. of 1 N hydrochloric acid and filtered with carbon through hyflo. The yellow filtrate is made alkaline with ammonia and the precipitated base is taken up in 20 ml. of benzene. The benzene solution is washed 5 times with 10 ml. of water each time, dried over potassium carbonate and then evaporated. The remaining raw product gives, after crystallisation from hexane, 66 mg. (42% of theoretical value) of 1-methyl-2-benzoyl-3-[2-(1-pyrrolidinyl)-ethoxy] - 5,6 - methylenedioxy-indole, M.P. 94–96°. This free base is dissolved in ethyl acetate and made acid to congo red with 6 N hydrogen chloride solution in isopropanol. The hydrochloride as obtained crystallises on the addition of ether and is dried at 50° in a vacuum. The obtained 1-methyl-2-benzoyl-3-[2-(1-pyrrolidinyl)-ethoxy]-5,6-methylenedioxy-indole hydrochloride melts at 182–185°. The 1-methyl-2-benzoyl-3-(2-chloroethoxy) - 5,6 - methylenedioxy-indole required as starting material is prepared as follows:

(a) 2.9 g. (0.013 mol) of N-methyl-4,5-methylenedioxy-anthranilic acid ethyl ester are dissolved in 3 ml. of diethylene-glycol-dimethylether and after the addition of 2 g. (0.010 mol) of phenacyl bromide, stirred for 3 days at 30–40° (magnetic stirrer). The reaction mixture becomes very viscous. 100 ml. of ethyl acetate is added and the hydrobromide of the reaction product is filtered off under suction and washed with 100 ml. of ethyl acetate. The hydrobromide is dissolved in 100 ml. of ice cold water, mixed with sodium carbonate and a liberated base taken up in ethyl acetate. The organic phase is separated off, washed one more time with water and dried over sodium sulfate. After evaporating the solvents, there remains 2.5 g. (73% of theoretical value) of yellow viscous N-phenylacyl - 4,5 - methylenedioxy-anthranilic acid ethyl ester.

(b) The obtained ester is dissolved in 10 ml. of absolute ethanol without further purification and at reflux temperature, mixed with 172 mg. of sodium (0.0075 mol), dissolved in 10 ml. of absolute ethanol. The resulting dark red solution is boiled for a further 10 minutes under reflux and then poured into 100 ml. of iced water and filtered with carbon through hyflo. The red filtrate is acidified with 2 N hydrochloric acid and the yellow crystals are filtered under suction and washed neutral with water. After recrystallisation from ethanol, 1.85 g. (63% of theoretical value) of brown red crystals were obtained being 1-methyl-2-benzoyl-3-hydroxy-5,6-methylenedioxy-indole, M.P. 157–160°.

(c) A solution of 34 mg. (0.0015 mol) of sodium in 20 ml. of absolute ethanol is mixed at room temperature with 400 mg. (0.0014 mol) of 1-methyl-2-benzoyl-3-hydroxy-5,6-methylene-dioxy-indole dissolved in 10 ml. of hexamethyl-phosphoric acid-triamide. The ethanol is evaporated in vacuo at 40°, the remaining solution is mixed with 4.3 g. of 1-bromo-2-chloroethane (0.003 mol) and heated for 2 hours at 100°. The reaction mixture is cooled and then poured into 100 ml. of ice water and 50 ml. of benzene. The organic phase is separated, washed twice with 100 ml. of water each time, then twice with 100 ml. of 1 N sodium hydroxide each time, dried over sodium and evaporated. The black viscous residue is extracted in 6 g. of kiesel gel and eluted with benzene-cyclohexane 1:1. The light yellow benzene cyclohexane solution is evaporated and 160 mg. of 1-methyl-2-benzoyl-3-(2-chloroethoxy) - 5,6 - methylenedioxy-indole (33% of theoretical value) is obtained as light yellow crystals, M.P. 133–115°.

EXAMPLE 13.—Preparation of tablets 250 g. of active substance, e.g. 1-methyl-2-(p-ethoxybenzoyl)-3-(2-diethylamino-ethoxy) - 5,6 - methylenedioxy-indole hydrochloride-hydrate, are mixed with 175.8 g. of lactose and 169.7 g. of potato starch. The obtained mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in. The mixture is then pressed into 10,000 tablets each weighing 100 mg. and each containing 25 mg. of active substance. The tablets can optionally be provided with grooves in order to facilitate a more accurate adherence to the dosage prescriptions.

EXAMPLE 14.—Preparation of dragées

A granulate is produced from 250 g. of active substance, e.g. 1 - methyl-2-(p-ethoxybenzoyl)-3-[2-(1-pyrrolidinyl)-ethoxy]-indole-hydrochloride-hydrate, 175.9 g. of lactose and an alcoholic solution of 10 g. of stearic acid. After drying, the granulate is mixed with 56.6 g. of colloidal silicon dioxide, 165 g. of talcum, 20 g. of potato starch and 2.5 g. of magnesium stearate and 10,000 dragée cores are pressed out from the obtained mixture. These are then firstly coated with an alcoholic solution of 6 g. of shellac, then with a concentrated syrup made from 502.28 g. of crystallised saccharose, 10 g. of gum arabic, 0.22 g. of dyestuff and 1.50 g. of titanium dioxide, and dried. The obtained dragées weigh 120 mg. and contain 25 mg. of active substance.

What is claimed is:
1. A compound of the formula

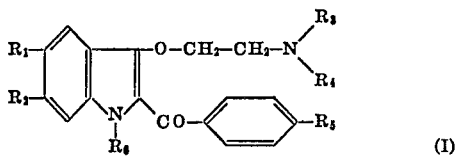

wherein
one of $R_1$ and $R_2$ is hydrogen, chloro, methyl or methoxy and the other one is hydrogen, or $R_1$ and $R_2$ together are methylenedioxy;
$R_3$ and $R_4$ are alkyl having at most 4 carbon atoms, or $R_3$ and $R_4$ together with the adjacent nitrogen are 1-pyrrolidinyl or piperidino;
$R_5$ is hydrogen, chloro, methyl or alkoxy having at most 3 carbon atoms; and
$R_6$ is alkyl having at most 3 carbon atoms, allyl or 2-propinyl, and the pharmaceutically acceptable acid addition salts thereof.

2. A compound according to claim 1, wherein each of $R_1$ and $R_2$ is hydrogen, or $R_1$ and $R_2$ together are methylenedioxy; each of $R_3$ and $R_4$ is ethyl or $R_3$ and $R_4$ together with the adjacent nitrogen is 1-pyrrolidinyl; $R_5$ is hydrogen or ethoxy; and $R_6$ is methyl or ethyl.

3. A compound according to claim 1 which is 1-methyl-2-benzoyl-3-[2-(1-pyrrolidinyl)-ethoxy]-indole.

4. A compound according to claim 1, which is 1-ethyl-2-(p-ethoxybenzoyl) - 3 - (2 - diethylaminoethoxy)-5,6-methylenedioxy-indole.

5. A compound according to claim 1, which is 1-methyl 2-(p-ethoxybenzoyl) - 3 - (2 - diethylaminoethoxy)-5,6-methylenedioxy-indole.

6. A compound according to claim 1, which is 1-methyl - 2 - (p-ethoxybenzoyl) - 3 - [2-(1-pyrrolidinyl)-ethoxy]-5,6-methylenedioxy-indole.

References Cited
UNITED STATES PATENTS
3,509,163    4/1970    Brandstrom et al. ___ 260—294.7

ALEX MAZEL, Primary Examiner

J. A. NARCAVAGE, Assistant Examiner

U.S. Cl. X.R.
260—326.16, 482 R; 424—267, 274

UNITED STATES PATENT OFFICE
CERTIFICATE OF CORRECTION

Patent No. 3,699,124   Dated October 17, 1972

Inventor(s) ANDRE GAGNEUX, ET. AL.

It is certified that error appears in the above-identified patent and that said Letters Patent are hereby corrected as shown below:

On the cover sheet insert -- The portion of the term of this patent subsequent to April 28, 1987, has been disclaimed. -- .

Signed and sealed this 21st day of January 1975.

(SEAL)
Attest:

McCOY M. GIBSON JR.
Attesting Officer

C. MARSHALL DANN
Commissioner of Patents

FORM PO-1050 (10-69)